US012647490B2

(12) United States Patent (10) Patent No.: US 12,647,490 B2
Novo Diaz et al. (45) Date of Patent: Jun. 2, 2026

(54) REGISTRATION OF RESOURCES IN A RESOURCE DIRECTORY

(71) Applicant: Telefonaktiebolaget LM Ericsson (publ), Stockholm (SE)

(72) Inventors: Oscar Novo Diaz, Helsinki (FI); Aitor Hernandez Herranz, Stockholm (SE); Roman Chirikov, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 18/710,354

(22) PCT Filed: Nov. 16, 2021

(86) PCT No.: PCT/EP2021/081857
§ 371 (c)(1),
(2) Date: May 15, 2024

(87) PCT Pub. No.: WO2023/088539
PCT Pub. Date: May 25, 2023

(65) Prior Publication Data
US 2025/0023956 A1 Jan. 16, 2025

(51) Int. Cl.
*G06F 15/16* (2006.01)
*H04L 67/12* (2022.01)
*H04L 67/51* (2022.01)
(52) U.S. Cl.
CPC .............. *H04L 67/51* (2022.05); *H04L 67/12* (2013.01)

(58) Field of Classification Search
CPC ................................ H04L 67/51; H04L 67/12
See application file for complete search history.

(56) References Cited

U.S. PATENT DOCUMENTS 7,187,671 B2 * 3/2007 Moyano ................ H04L 65/104
370/465
11,121,989 B1 * 9/2021 Castinado ............... H04L 51/56
(Continued)

OTHER PUBLICATIONS

International Search Report and Written Opinion issued in International Application No. PCT/EP2021/081857 dated Aug. 25, 2022 (17 pages).

(Continued)

*Primary Examiner* — John B Walsh
(74) *Attorney, Agent, or Firm* — Rothwell, Figg, Ernst & Manbeck, P.C.

(57) ABSTRACT

A method performed by a resource directory node for registration of resources offered by endpoints in a resource directory comprises receiving (S201) from a first endpoint a registration request, wherein the registration request comprises information on one or more resources of the first endpoint. The method further comprises analysing (S202) the information on the one or more resources of the first endpoint with reference to the resource directory, and determining (S203) based on the analysis if at least one of the resources of the first endpoint should be registered. The method also comprises, if it is determined that at least one of the resources of the first endpoint should be registered, entering (S204) registration information for the at least one resource to be registered into the resource directory and sending registration confirmation to the first endpoint.

20 Claims, 19 Drawing Sheets

(56)        References Cited

U.S. PATENT DOCUMENTS

| 2016/0218992 A1 | 7/2016 | Hong et al. |
| 2018/0295066 A1* | 10/2018 | Pawar .................. H04L 47/724 |
| 2020/0366718 A1 | 11/2020 | Novo Diaz |
| 2021/0211509 A1 | 7/2021 | Ly et al. |

OTHER PUBLICATIONS

International Preliminary Report On Patentability issued in International Application No. PCT/EP2021/081857 dated Feb. 14, 2024 (9 pages).
Written Opinion of the IPEA issued in International Application No. PCT/EP2021/081857 dated Nov. 6, 2023 (6 pages).
Response to ISA Written Opinion issued in International Application No. PCT/EP2021/081857 dated Sep. 15, 2023 (13 pages).
Response to IPEA Written Opinion issued in International Application No. PCT/EP2021/081857 dated Jan. 3, 2024 (7 pages).
AmsAss, C. et al., "CoRE Resource Directory" draft-ietf-core-resource-directory-28, Mar. 7, 2021 (88 pages).
Makoumis, Y. et al., "Network Tokens" draft-yiakoumis-network-tokens-02, Dec. 21, 2020 (26 pages).
Hartke, K., "Observing Resources in the Constrained Application Protocol (CoAP)", Sep. 2015 (30 pages).
Shelby, Z. et al., The Constrained Application Protocol (CoAP), Jun. 2014 (112 pages).

* cited by examiner

S501 ────────▶ Send registration request

S502 ────────▶ Receive partial registration confirmation

S503 ────────▶ Receive registration confirmation

REGISTRATION OF RESOURCES IN A RESOURCE DIRECTORY

CROSS REFERENCE TO RELATED APPLICATIONS

This application is a 35 U.S.C. § 371 National Stage of International Patent Application No. PCT/EP2021/081857, filed 2021 Nov. 16. The above identified application is incorporated by this reference.

TECHNICAL FIELD

The present disclosure relates to a method for registration of resources offered by endpoints in a resource directory, a resource directory node for registration of resources offered by endpoints in a resource directory, a method performed by an endpoint for requesting registration of resources offered by the endpoint in a resource directory, an endpoint for requesting registration of resources offered by the endpoint in a resource directory, a communication network, corresponding computer programs, corresponding data carrier signals, and corresponding computer program products.

BACKGROUND

The term "Internet of Things" (IoT) is used to refer to devices, which may include computing devices such as digital machines or mechanical devices, that are enabled for communication network connectivity. Communication network connectivity allows IoT devices to be remotely managed, and data collected or required by the devices may be exchanged between individual devices and between devices and application servers. Examples of IoT devices include sensors, actuators, smart appliances, and so on. Some IoT devices are subject to limitations on processing power, storage capacity, energy supply, device complexity and/or network connectivity, imposed by their operating environment or situation, and may consequently be referred to as constrained IoT devices (or simply constrained devices). IoT devices are common examples of endpoints in networks, although endpoints may also be in the form of other, non-IoT devices, such as other computing devices.

Devices, such as IoT devices, may offer resources. The nature of the resources offered by a device is largely dependent on the type of device in question; different devices may offer sensor capabilities, audio or video recording capabilities, actuators (for example, for windows, valves, and so on), switches, and so on. The discovery of resources is very important in IoT networks. However, in many IoT applications, and particularly those using constrained IoT devices, direct discovery of resources is not practical. This lack of practicality may result, for example, because IoT devices or other components in the network may be in an idle state, or multicast traffic may be inefficient. Some issues with resource discovery may be mitigated by employing an entity called a Resource Directory (RD), which contains information about resources held on the IoT devices and allows this information to be retrieved. A discussion of the properties of RDs can be found in "CORE Resource Directory" by the Internet Engineering Task Force (IETF), available at https://www.ietf.org/archive/id/draft-ietf-core-resource-directory-28.txt as of 3 Nov. 2021. In particular, section 3 of "CoRE Resource Directory" explains how RDs may provide an interface for discovery, creation, maintenance, and removal of device registrations. A lookup interface may be used by clients to discover the resources stored in the RD (as discussed in section 4 of "CoRE Resource Directory"). The registration interface that may be used by devices such as IoT devices to register their resources is considered in section 5 of "CORE Resource Directory". A general overview of an example system architecture including an RD, a client, and plurality of IoT devices (in the example, three IoT devices), is shown in FIG. 1.

In existing systems, there are no restrictions on devices (such as IoT devices) seeking to register their resources into the RD. As a consequence, it is possible for several resources (for example sensors or actuators) performing the same tasks to be registered in the RD, resulting in redundancy in the RD and the IoT network. As an example of this redundancy, several IoT devices may be pre-installed in a factory environment to measure the temperature of the factory; all of these devices may not be required to operate simultaneously. Unwanted redundancy may result in, for example, excessive consumption of the resources (such as battery, CPU, and/or memory) of the IoT devices. Also, IoT devices may dynamically join or leave a network at any time. Consequentially, keeping track of the IoT resources of a network may be problematic.

SUMMARY

It is an object of the present disclosure to provide improved resource handling, including resource registration, and thereby to reduce unwanted resource redundancy.

Embodiments provide resource directory nodes, endpoints, communication networks, methods and computer programs which at least partially address one or more of the challenges discussed above.

According to an embodiment, there is provided a method for registration of resources offered by endpoints in a resource directory. The method is performed by a resource directory node, and comprises receiving, at the resource directory node from a first endpoint, a registration request. The registration request comprises information on one or more resources of the first endpoint. The resource directory node analyses the information on the one or more resources of the first endpoint with reference to the resource directory, and determines based on the analysis if at least one of the resources of the first endpoint should be registered. If it is determined that at least one of the resources of the first endpoint should be registered, the resource directory node enters registration information for the at least one resource to be registered into the resource directory, and sending a confirmation of the registration of the at least one resource to the first endpoint.

In some embodiments the method may further comprise storing at the resource directory node information on the one or more resources of the first endpoint. The stored information may include an indication that at least one of the one or more resources is partially registered.

According to a further embodiment, there is provided a resource directory node for registration of resources offered by endpoints in a resource directory. The resource directory node comprises processing circuitry and a memory containing instructions executable by the processing circuitry. The resource directory node is operable to receive from a first endpoint a registration request, wherein the registration request comprises information on one or more resources of the first endpoint. The resource directory node is further operable to analyse the information on the one or more resources of the first endpoint with reference to the resource directory, and determine based on the analysis, if at least one of the resources of the first endpoint should be registered. If it is determined that at least one of the resources of the first endpoint should be registered, the resource directory node is operable to enter registration information for the at least one resource to be registered into the resource directory and send confirmation of the registration of the at least one resource to the first endpoint.

In some embodiments the resource directory node may be further operable to store information on the one or more resources of the first endpoint. The stored information may include an indication that at least one of the one or more resources is partially registered.

BRIEF DESCRIPTION OF THE DRAWINGS

The disclosure is described, by way of example only, with reference to the figures, in which.

DETAILED DESCRIPTION

For the purpose of explanation, details are set forth in the following description in order to provide a thorough understanding of the embodiments disclosed. It will be apparent, however, to those skilled in the art that the embodiments may be implemented without these specific details or with an equivalent arrangement.

Figure 1:
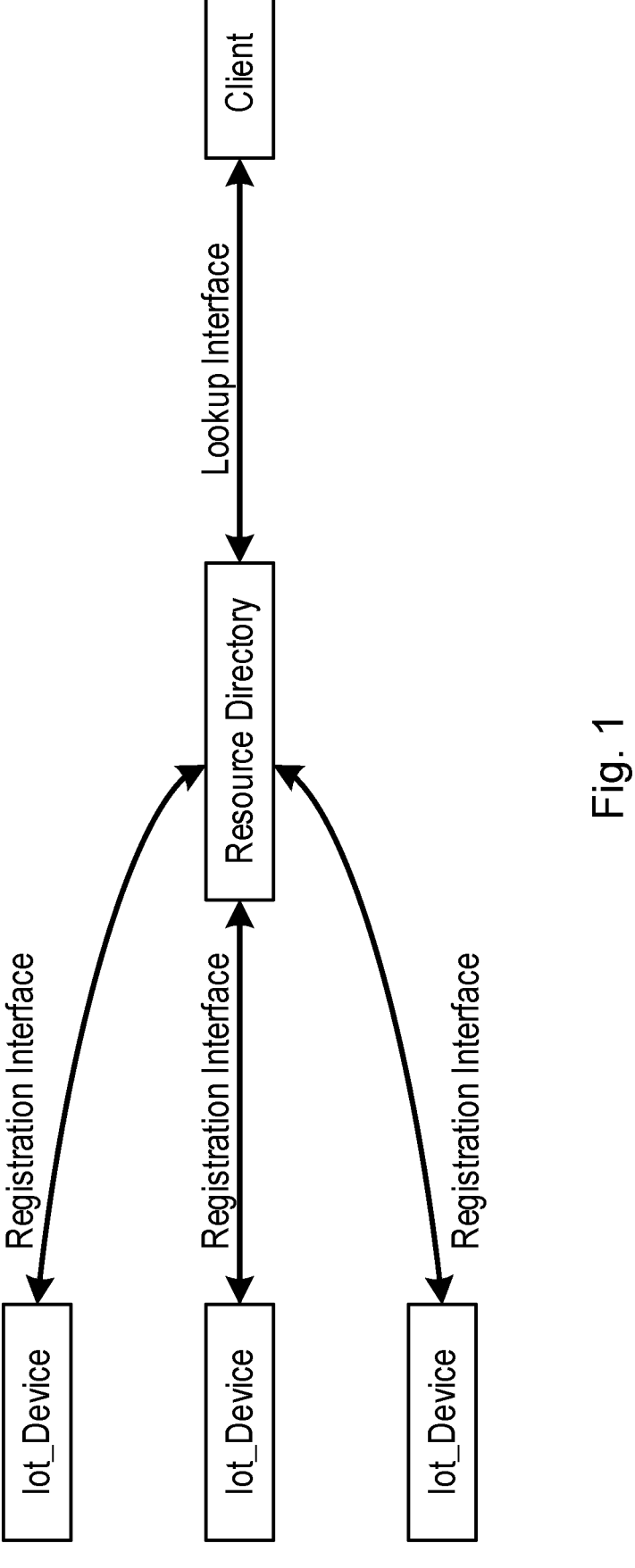
FIG. 1 is a general overview of an example system architecture.
Figure 2:
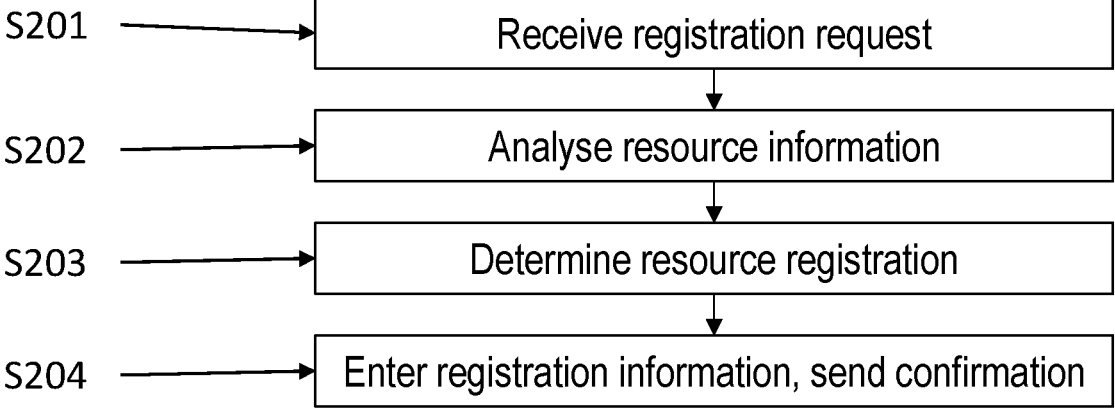
FIG. 2 is a flowchart showing a method for registration of resources according to embodiments.
Figure 3A:
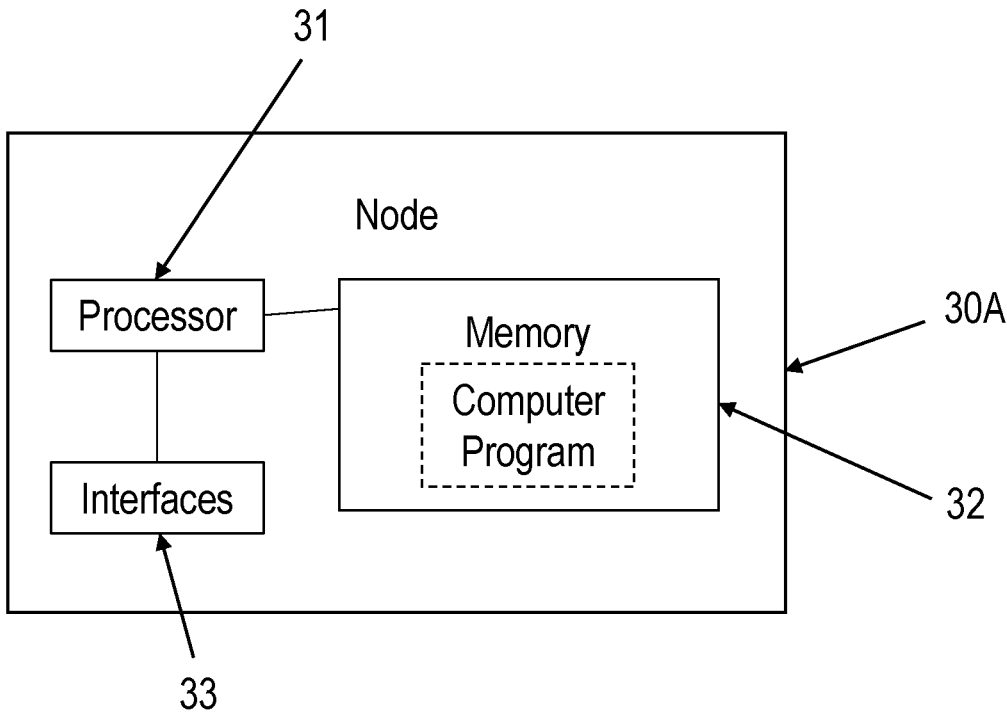
FIG. 3A is a schematic diagram of a resource directory node according to embodiments.
Figure 3B:
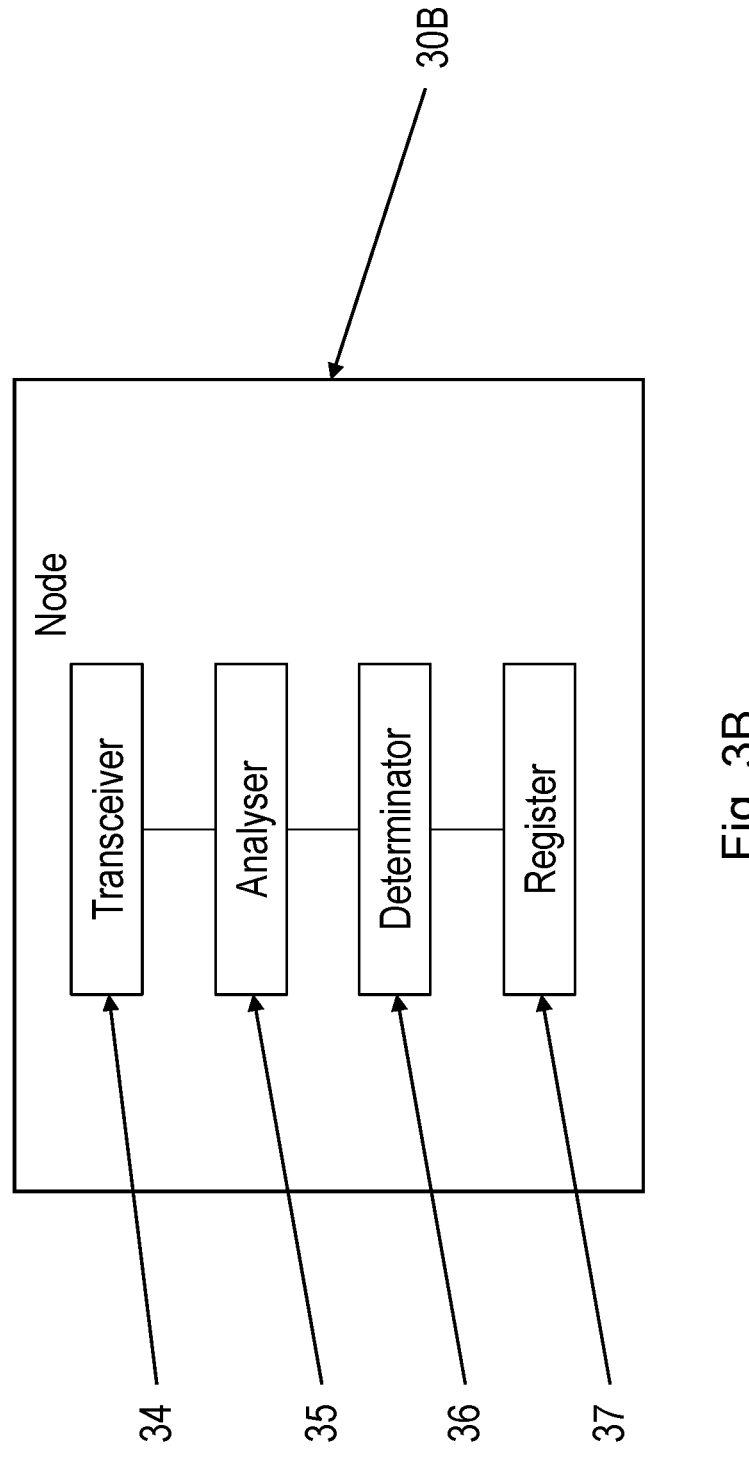
FIG. 3B is a schematic diagram of a further resource directory node according to embodiments.
Figure 4A:
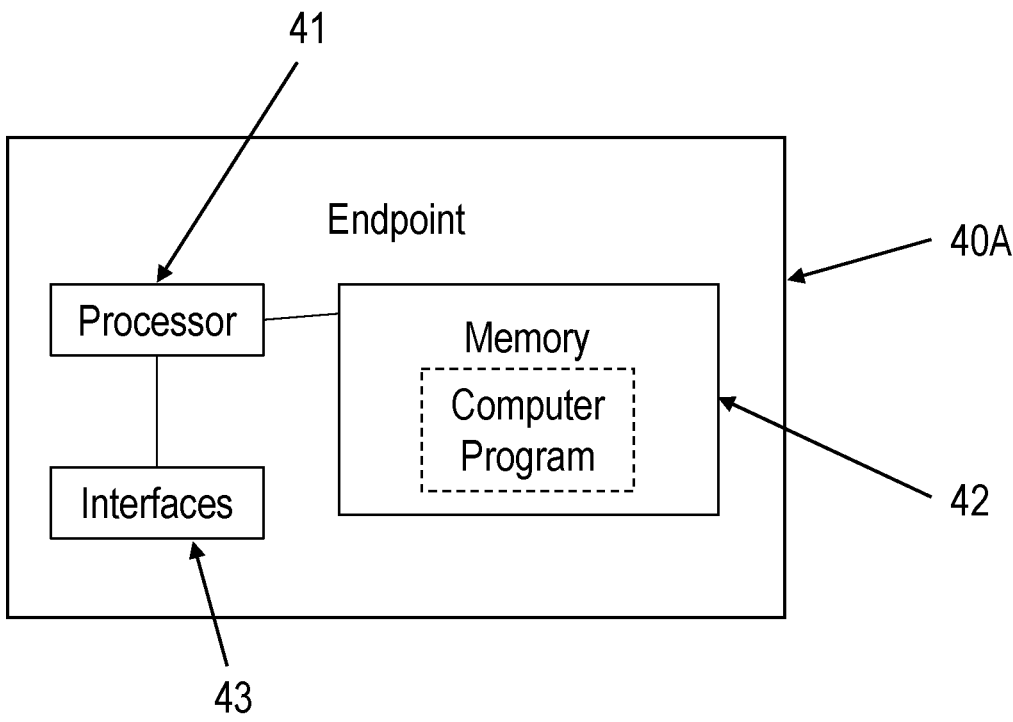
FIG. 4A is a schematic diagram of an endpoint according to embodiments.
Figure 4B:
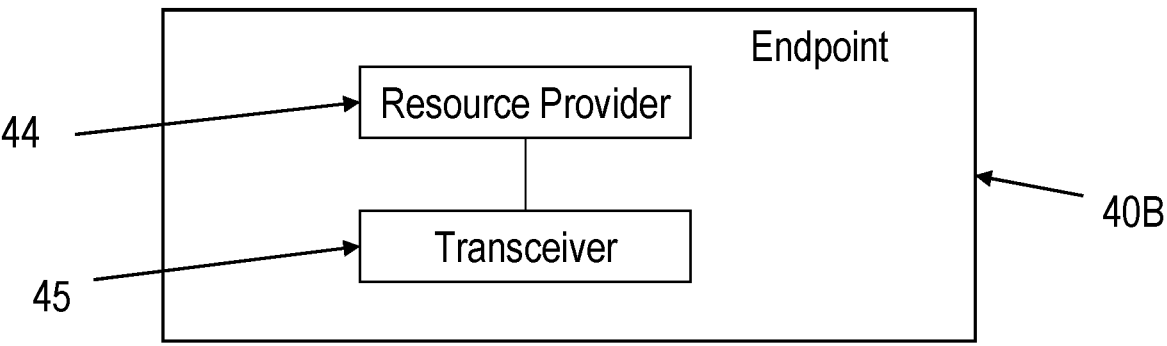
FIG. 4B is a schematic diagram of a further endpoint according to embodiments.
Figure 5:
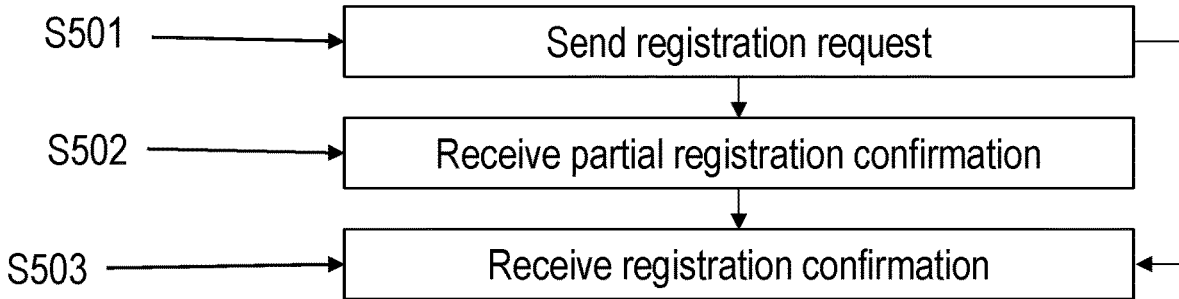
FIG. 5 is a flowchart showing methods for requesting registration of resources in accordance with embodiments.

FIG. 2 is a flowchart showing a method for registration of resources according to embodiments. The method of FIG. 2 may allow a resource directory node to efficiently monitor resources in a network (such as an IoT network), and may also allow the resource directory node to restrict registration of resources to necessary resources. Methods according to embodiments may be implemented by resource directory nodes; examples of resource directory nodes 30A, 30B (which may be referred to more generally as resource directory node 30) in accordance with embodiments are shown in FIG. 3A and FIG. 3B. The resource directory nodes 30A, 30B may perform the method of FIG. 2. Further, FIG. 4A and FIG. 4B show endpoints 40A, 40B (which may be referred to more generally as endpoint 40) in accordance with embodiments. The endpoints 40A, 40B (which may be computing devices such as IoT devices) may offer resources, which may be registered using the method shown in the flowchart of FIG. 2. Further, methods for requesting registration of resources in accordance with embodiments may be performed by the endpoint 40. FIG. 5 is a flowchart showing methods for requesting registration of resources in accordance with embodiments; said methods may be performed by endpoint 40.

In step S201 the resource directory node 30 receives a registration request message from a first endpoint (which may be endpoint 40). The registration request comprises information on one or more resources of the first endpoint, for example, information on sensors offered by the first endpoint. The registration request message may have been sent by the endpoint 40 as shown in step S501 of FIG. 5. The registration request message may be received, for example, by the processor 31 of node 30A running a program stored on the memory 32 in conjunction with the interfaces 33 (which may include a transceiver, for example), or may be performed by the transceiver 34 of node 30B. The registration request message may be sent, for example, by the processor 41 of endpoint 40A running a program stored on the memory 42 in conjunction with the interfaces 43 (which may include a transceiver, for example), or may be performed by the transceiver 45 of node 40B. As mentioned above, the registration request includes information on one or more resources of the first endpoint; these resources may be provided by the processor 41 of endpoint 40A running a program stored on the memory 42 in conjunction with the interfaces 43, or by the resource provider 44 of the endpoint 40B. The resources may essentially define functions that the endpoint may offer, such as sensor functions, switching functions, actuator functions, and so on.

In some embodiments, when the registration request has been received, the resource directory node may then store information on the one or more resources of the first endpoint, wherein the stored information includes an indication that at least one of the one or more resources is partially registered. The information may be stored, for example, in the resource directory. Alternatively, the information may be stored separate from the resource directory. In some embodiments, the indication that a resource is partially registered may be a flag associated with the information on the resource. The term "partially registered" when used with reference to a resource or resources is used to indicate that the resource or resources are not fully registered in the resource directory, but are instead pending full registration (that is, the registration process may be considered to be ongoing and not complete). The partial registration may also be referred to as a pre-registration.

In embodiments where the resource directory node stores information on the resource(s) including an indication that at least one of the one or more resources is partially registered, the resource directory node may also send to the endpoint confirmation that the information on the at least one of the one or more resources has been stored, said information including the indication that the at least one resource is partially registered. This confirmation may then be received by the endpoint as shown in step S502 of FIG. 5. The confirmation may essentially function as an acknowledgement to the endpoint of the registration request. In alternative embodiments, the resource directory node may omit sending confirmation that the information on the at least one of the one or more resources has been stored (including an indication of partial registration) to the endpoint.

Where the resource directory node has stored the information (including the indication of partial registration), this information may be retained indefinitely or until a further message is received from the endpoint rescinding the registration request. In alternative embodiments, the stored information including the indication may be deleted a predetermined time period after being stored. The predetermined time period may be a default parameter of the resource directory node, may be specified in the registration request from the endpoint, may be altered by a further message from an endpoint (such as a registration update message) or otherwise received by the resource directory node (for example, from a further network component such as a network controller) or may be provided in any other suitable way. The endpoint may send a message that does not alter the duration of the predetermined time period, but which causes the period to be (for example) restarted. In some embodiments a default duration for the predetermined time period may be 25 hours.

Following the registration request receipt, the resource directory node then analyses the information on the one or more resources of the first endpoint with reference to the resource directory, as shown in step S202 of FIG. 2. The information may be analysed, for example, by the processor 31 of node 30A running a program stored on the memory 32 in conjunction with the interfaces 33, or may be analysed by the analyser 35 of node 30B. Based on the results of the analysis, the resource directory node may then determine if any of the resources offered by the endpoint should be registered (that is, fully registered) in the resource directory, as shown in step S203 of FIG. 2. The determination may be made, for example, by the processor 31 of node 30A running a program stored on the memory 32 in conjunction with the interfaces 33, or may be made by the determinator 36 of node 30B.

The determination of whether or not a resource of an endpoint should be registered may be made based on availability, that is, if the resource is available it may be registered; this may result in substantially all resources offered by endpoints being registered. In some embodiments, the determination of whether one or more resources of an endpoint should be registered may be based on a registration policy. Where a registration policy is used in the determination of whether to register resources, the nature of the registration policy may be determined by the type of network (for example IoT network) to which the resources and resource directory relate, and what configuration of resources is desirable for that network. It may be desirable to ensure close monitoring of an environment, in which case a registration policy may be configured to prioritise a number of active sensor resources (for example). Additionally or alternatively, it may be desirable to ensure that there are no time periods when a particular environment is not monitored, in which case a registration policy may be configured to prioritise maintain a set level of sensor redundancy (for example, at least three active temperature sensors at all times, at least two active microphones at all times, and so on). Additionally or alternatively, it may be desirable to ensure that an IoT network can operate without maintenance for as long as possible, in which case a registration policy may be configured to prioritise sensor and/or endpoint battery lifetime for example. Different policies may comprise one or more of the example priorities listed above, given different weightings (for example, battery lifetime should be prioritised but maintaining at least two active pressure sensors is of higher weighting), and may also comprise other priorities. Further examples of policies that may be used are as follows:

Policy to avoid redundancy: keep only one sensor of a type.

Policy to extend battery lifetime: set cycles of sensors so that they do measurements in turns (3 sensors→3 times longer battery lifetime of each). Thus, the resource directory adds and removes registrations of the sensors in cycles.

Policy to have as many measurements as possible: use all available sensors in the IoT network.

Policy to obtain needed redundancy: use M out of N available sensors (where M and N are integers, M being less than or equal to N).

In some embodiments, the information on one or more resources of the first endpoint received in the registration request may comprise priority values for the resources; where this is the case the determination of whether at least one of the resources of the first endpoint should be registered may take into account the priority values. As an example of this, if a registration request for a resource of medium priority level is received at the same time as a registration request for an equivalent resource of high priority level, the high priority level resource may be registered, and the medium priority level resource not registered. In a further example, the registration of an already registered resource may be rescinded if a registration request for a higher priority resource is received, wherein the higher priority resource may then replace the registered resource. The policy may also take into account other properties of the network, such as consolidating the desired resources in the smallest practical number of endpoints to save energy or alternatively ensuring that resources are spread across a number of endpoints to ensure that the loss of a single endpoint does not drastically reduce available resources. As will be appreciated by those skilled in the art, where policies are used in the determination, these policies may vary between network depending on network requirements.

If it is determined to register at least one resource, registration information for the at least one resource to be registered is entered into the resource directory as shown in step S204 of FIG. 2. In some embodiments where the resource directory node has stored information on the resources including indications of partial registration in the resource directory, the entry of the registration information into the resource directory may involve removing the indications of partial registration relating to the resource(s) to be registered, while retaining indications of partial registration for resources that are not to be fully registered and are therefore to remain partially registered. In some embodiments where the stored information on the resources including indications of partial registration has been stored separately from the resource directory, the entry of the registration information (that is, the full registration of the resource) may comprise copying the relevant information from the stored information without the indications (and potentially although not necessarily deleting the respective stored information on the resources including indications of partial registration). In some embodiments the process of entering the registration information for the at least one resource to be registered into the resource directory comprises setting a duration of the registration of the resource as a registration period. The registration period, where used, may be the same as or different to the predetermined time period for which stored information including the indication of partial registration is retained before deletion. In alternative examples, the registration period may be indefinite/until further notice. In some embodiments where the registration period is used, the duration of the registration of the resource may be set as a registration period minus the duration the information on the resource including the indication has been stored; as an example of this, if the registration period is 20 hours, and information on the resource including the indication of partial registration has been stored for 6 hours (that is, the resource has been partially registered for 6 hours) before the resource is fully registered, the duration of registration of the resource may then be set as 14 hours (that is, 20 hours minus 6 hours).

It may be the case that the determination to register a resource is made as soon as the information on the resource has been analysed (that is, shortly after the registration request is received at the resource directory node); this may be the case where an offered resource is not provisioned by existing resources registered in a resource directory. Alternatively, a resource may be partially registered for an extended period of time (for example, hours) before it is determined that the resource should be registered. A resource may be partially registered for an extended period of time when, for example, the resource is not required when the registration request is received by the resource directory node, but subsequently is required. If a registered resource from the resource database becomes unavailable, the unavailable resource may be replaced with an equivalent resource having information including an indication stored (and the indication may be removed). Registered resources may become unavailable for a variety of reasons, for example, because: a registration period for the registered resource expires without renewal; and/or an endpoint providing the registered resource deregisters from the communication network; and/or an endpoint providing the registered resource is deactivated.

When registration information for the at least one resource to be registered has been entered into the resource directory, confirmation of the registration of the at least one resource is then sent to the endpoint, as shown in step S204 of FIG. 2. The determination and sending of confirmation of registration may be performed, for example, by the processor 31 of node 30A running a program stored on the memory 32 in conjunction with the interfaces 33 (which may include a transceiver, for example), or may be performed by the determinator 36 (in conjunction with the register 37) and transceiver 34 of node 30B. The registration confirmation message may be received, for example, by the processor 41 of endpoint 40A running a program stored on the memory 42 in conjunction with the interfaces 43 (which may include a transceiver, for example), or may be received by the transceiver 45 of node 40B. The reception of the registration confirmation may be received by an endpoint as shown in step S503 of FIG. 5. In embodiments where a partial registration confirmation is not received by the endpoint (that is, step S502 is not performed), the registration confirmation may be the only confirmation received by the endpoint.

Figure 6:
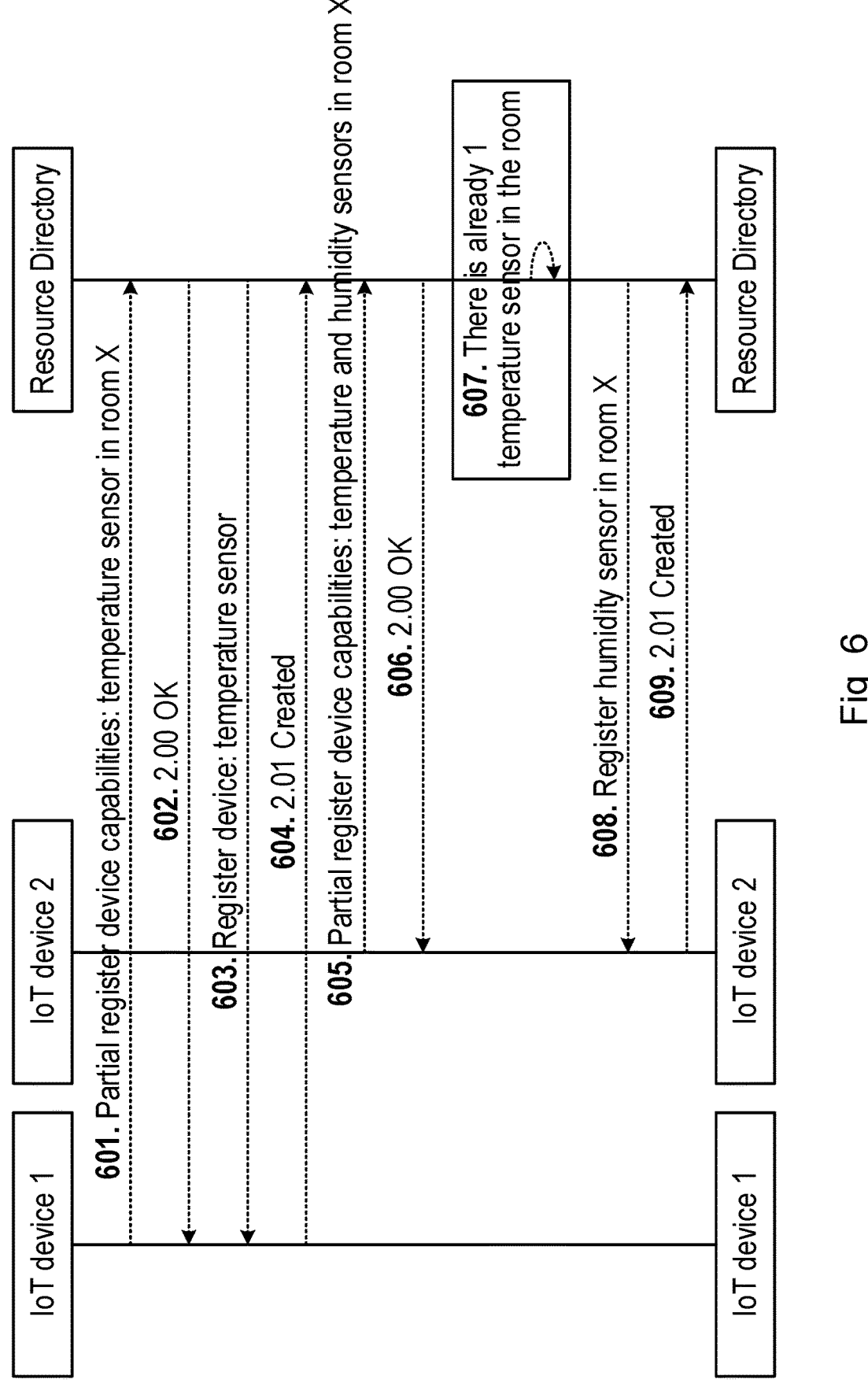
FIG. 6 is a sequence diagram showing an example of a method in accordance with embodiments.

FIG. 6 is a sequence diagram showing an example of a method in accordance with embodiments. In the example shown in FIG. 6 two endpoints, both of which are IoT devices, attempt to register resources in the resource directory (which is hosted by a resource directory node). At step 601 of FIG. 6, IoT device 1 sends a registration request to the resource directory node for a single resource (a temperature sensor in room X). The resource directory node then stores information on the resource, said information including the indication that the at least one resource is partially registered. In this example, the resource directory node hosting the resource directory sends confirmation of the storage to IoT device 1, as shown in step 602. The resource directory node determines that the temperature sensor should be registered in the resource directory and registration information for the temperature sensor is entered into the resource directory; a confirmation of registration of the temperature sensor is sent to IoT device 1 in step 603. At step 604, IoT device 1 then sends an acknowledgement of the registration of the temperature sensor; this is shown in FIG. 6 as a 2.01 Created message, a 2.00 OK message as used in step 602 may alternatively be used (the same is true for analogous step 609). Subsequently, at step 605, IoT device 2 sends a registration request to the resource directory node for two resources, specifically a temperature sensor in room X and a humidity sensor in room X. Similar to step 602, the resource directory node sends a confirmation to IoT device 2 of the partial registration of both resources. At step 607, the resource directory node determines, potentially using a policy as discussed above, to register the humidity sensor of IoT device 2 and not to register the temperature sensor of IoT device 2; in this example, this is because the temperature sensor of IoT device 1 is already satisfying the temperature sensing role. Steps 608 and 609 are then performed for the humidity sensor; these steps are analogous to steps 603 and 604 as discussed above. The temperature sensor of IoT device 2 remains preliminarily registered.

Figure 7:
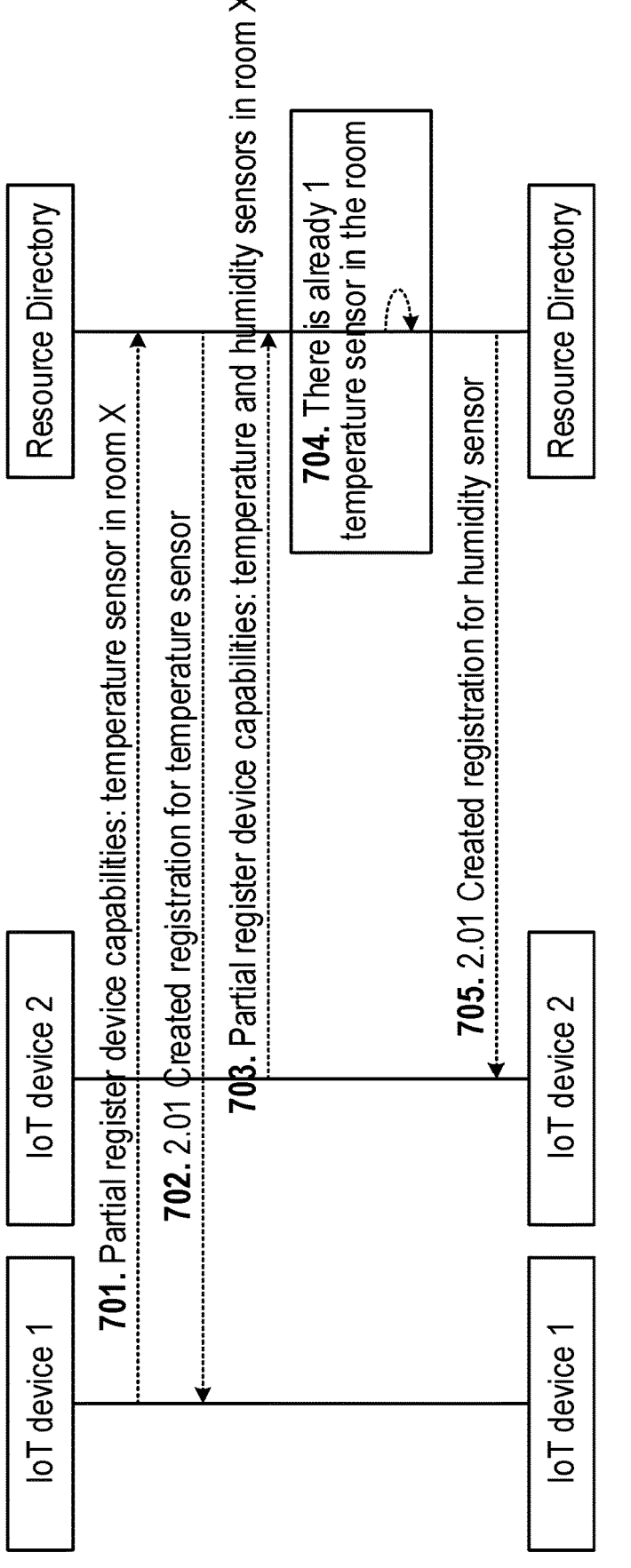
FIG. 7 is a sequence diagram showing an example of a further method in accordance with embodiments.

FIG. 7 is a sequence diagram showing an example of a further method in accordance with embodiments. The method shown in FIG. 7 is similar to that shown in FIG. 6; again the method shows IoT devices 1 and 2 attempting to register the same resources as in FIG. 6. In FIG. 7, the resource directory node does not send to the endpoints (IoT devices 1 and 2) confirmation of the storage of information on the resources, said information including the indications of partial registration. Equally the IoT devices do not send acknowledgements to the resource directory node when the confirmation of registration of a resource is received. Accordingly, there are no steps equivalent to steps 602, 604, 606 and 609 in FIG. 7. The other steps of FIG. 7 map to those of FIG. 6: step 701 is equivalent to step 601; step 702 is equivalent to step 603; step 703 is equivalent to step 601; step 703 is equivalent to step 605; step 704 is equivalent to step 607 and step 705 is equivalent to step 608.

Figure 8A:
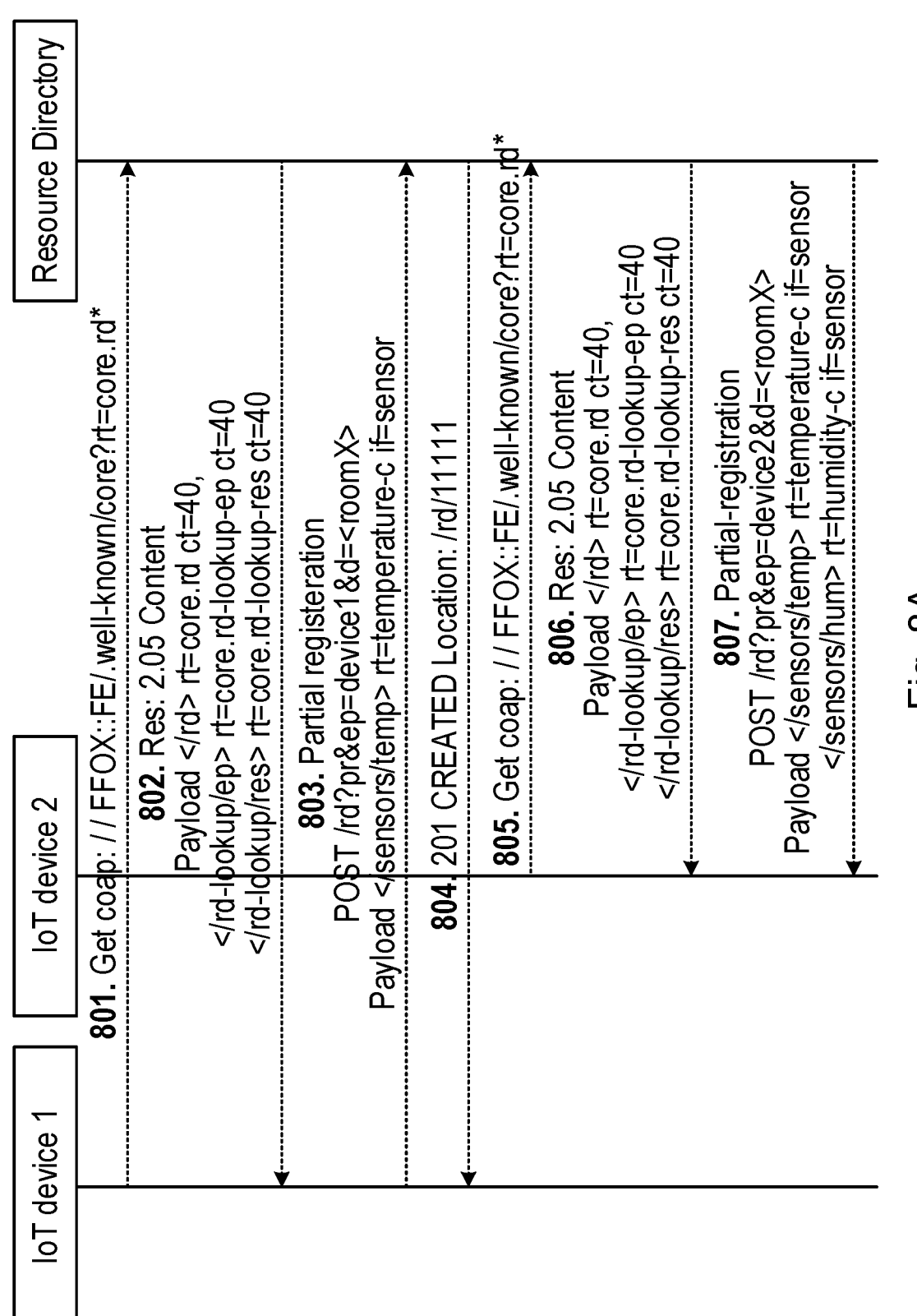
FIG. 8A and FIG. 8B are a sequence diagram showing an embodiment implemented in a network including IoT devices.
Figure 8B:
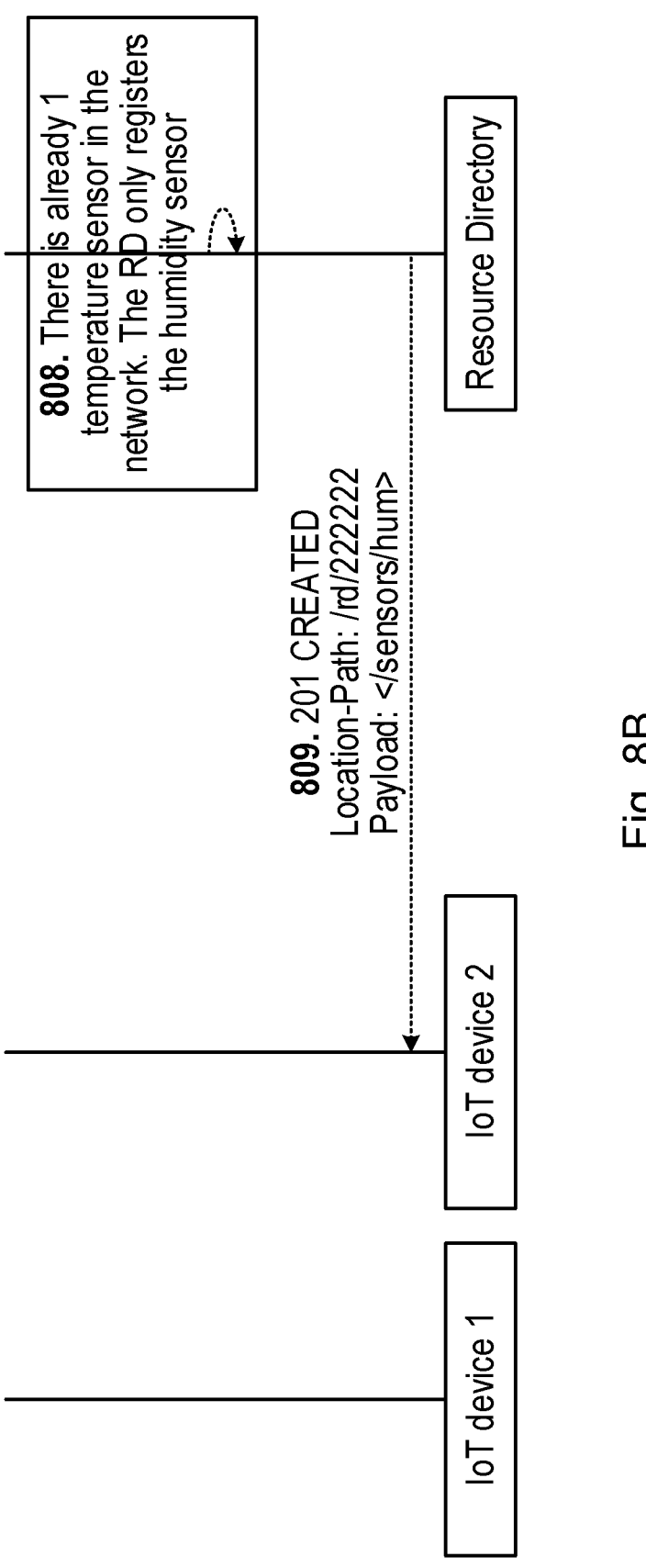

FIG. 6 and FIG. 7 show examples of how methods in accordance with embodiments may be implemented in networks including IoT devices as endpoints. A further example of this is shown in FIG. 8A and FIG. 8B. FIG. 8A and FIG. 8B (collectively FIG. 8) are a sequence diagram showing in more detail than FIG. 6 or FIG. 7 how embodiments may be implemented in networks including IoT devices. In particular, FIG. 8 shows how embodiments may be implemented in systems configured as detailed in "CoRE Resource Directory", as discussed above. Before an IoT device can make use of a resource directory, it must first know the address and port, as well as the Uniform Resource Identifier (URI) paths of the resource directory Representational State Transfer (REST) Application Program Interfaces (APIs). In some embodiments, the discovery of the resource directory functionality may be performed by sending a unicast GET request to "/.well-known/core". Upon success, the response will contain a payload with the resource directory functions. The GET request and response for IoT device 1 are shown in steps 801 and 802 of FIG. 8, respectively. The GET request and response for IoT device 2 are shown in steps 805 and 806 of FIG. 8, respectively.

After discovering the location and functions of a resource directory, the IoT devices partial register their resources using the registration interface as shown in step 803 and step 807. IoT device 1 partial registers its temperature sensor in step 803. The resource directory, after checking its internal policy, registers the temperature sensor of IoT device 1 since there is not any resource with similar capabilities registered in the network, the registration confirmation is sent to IoT device 1 in step 804. In this example, the internal policy of the resource directory is to avoid redundancy in the network, keeping only one sensor of the same type in the network.

IoT device 2 partial registers its temperature and its humidity sensors to the resource directory in step 807. The resource directory determines to register only the humidity sensor as shown in step 808 (as indicated by the specification of the humidity sensor in the payload's response). The temperature sensor is not registered as there is already another temperature sensor with similar capabilities registered in the network. The registration confirmation for the humidity sensor is sent to IoT device 2 in step 809. The temperature sensor is not mentioned in the registration confirmation, therefore IoT device 2 infers that the temperature sensor is not registered.

Figure 9A:
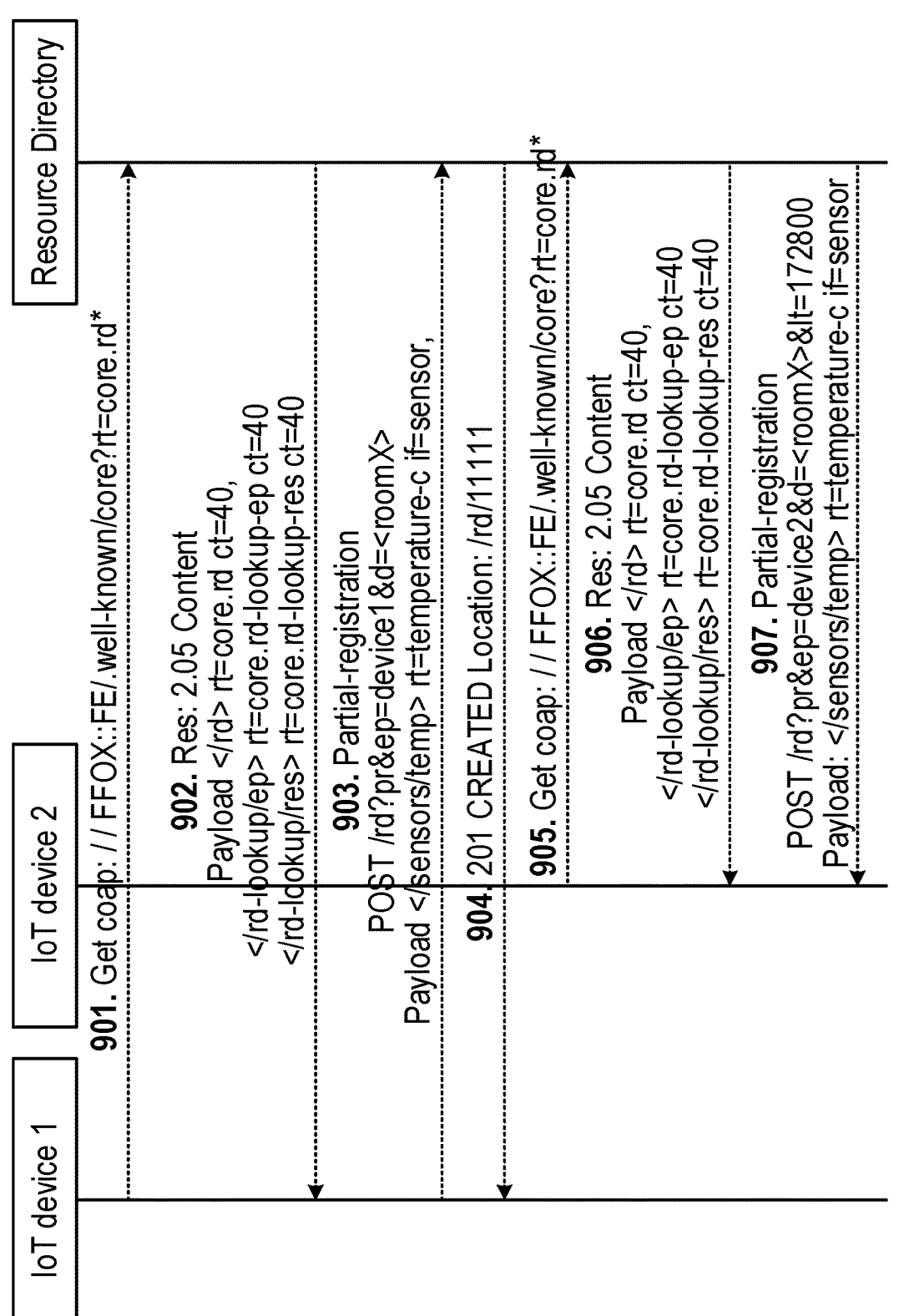
FIG. 9A and FIG. 9B are a sequence diagram showing an embodiment in which a resource is registered after the registration of another resource expires.
Figure 9B:
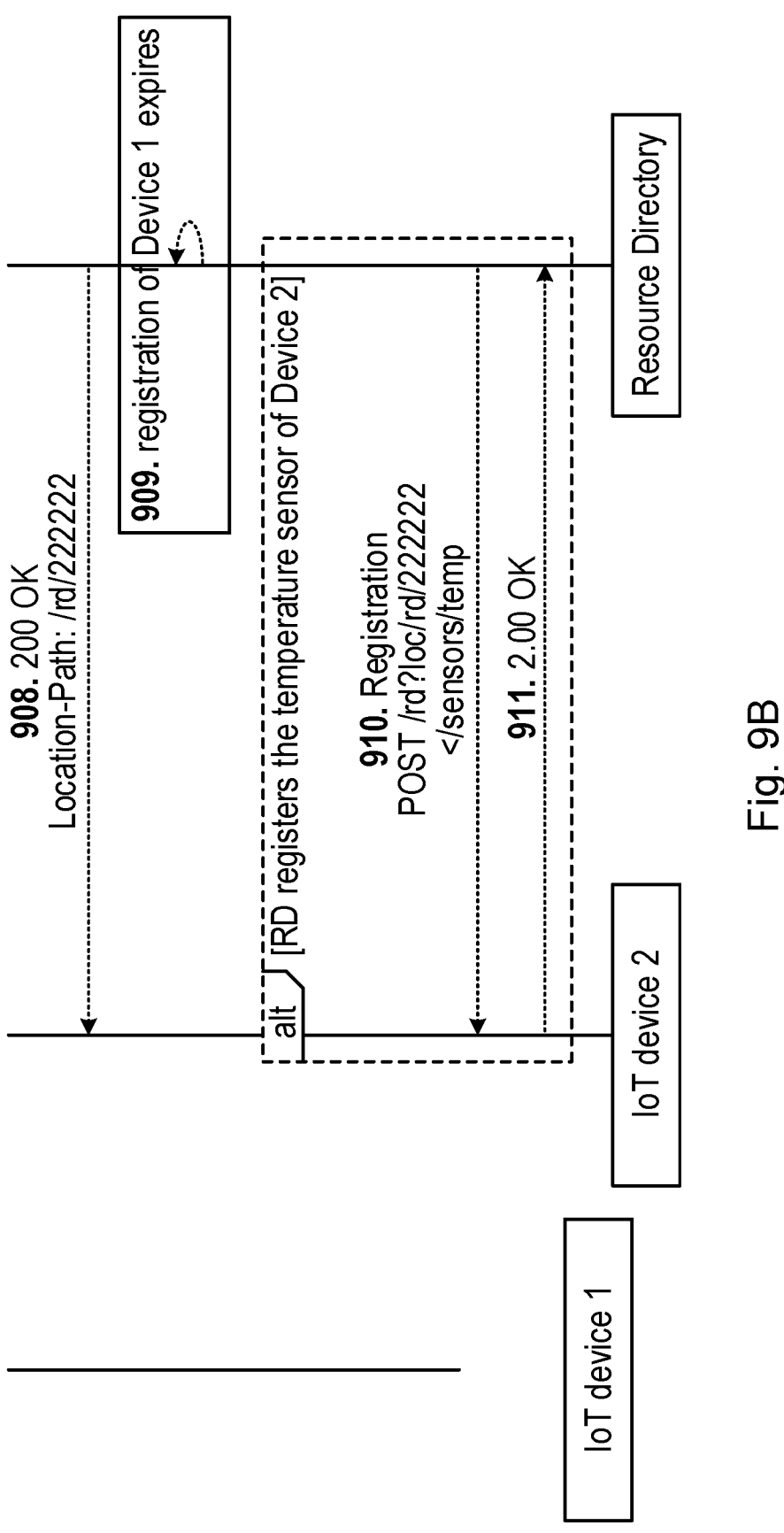

FIG. 8 shows the procedure for registration of resources. In FIG. 8, the resources are registered for a default period, for example, 25 hours. FIG. 9A and FIG. 9B (collectively FIG. 9) shows a further example in which a resource is registered after the registration of another resource expires. In steps 901 to 904 of FIG. 9, IoT device 1 partially registers a temperature sensor (as discussed above in the context of steps 801 to 804 of FIG. 8) without specifying a registration period, so a default period of 25 hours (the default period for this example) is used. The temperature sensor of IoT device 1 is immediately registered for a registration period of 25 hours minus the preregistration period; the resulting registration period is just less than 25 hours. Subsequently, in steps 905 to 908, IoT device 2 partially registers a further temperature sensor, specifying a duration of 172800 seconds (48 hours) for the partial registration. At step 909, the registration of the temperature sensor of IoT device 1 expires 25 hours from the initial partial registration of the temperature sensor. At this point, the temperature sensor of IoT device 2 has at least 23 hours of its partial registration period remaining. Accordingly, in steps 910 and 911, the temperature sensor of IoT device 2 is registered to replace the temperature sensor of IoT device 1. As explained above, a resource may become unavailable for various other reasons in addition to a registration period expiring, for example, because an IoT device deregisters the resource. Equivalent procedures to those shown in FIG. 9 may be used whenever it is desired to replace a resource that ceases to be available, for any reason.

Embodiments introduce operations that may be used in resource registration methods involving resource directories. In embodiments implemented in systems based on "CoRE Resource Directory", the operations may necessitate changes to the operations defined in "CoRE Resource Directory". Embodiments may include a new partial registration operation, and/or may extend the registration operation defined in section 5 of "CORE Resource Directory".

Figure 10A:
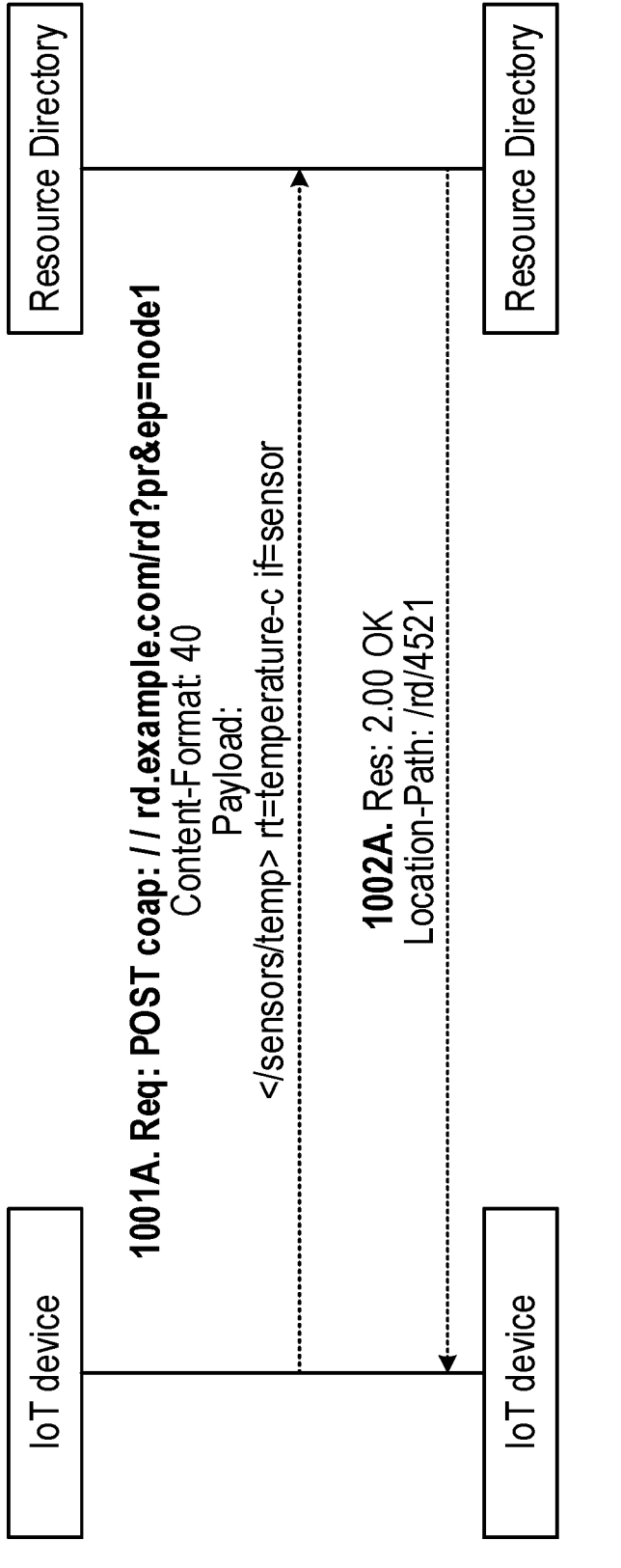
FIG. 10A is a sequence diagram showing the use of an acknowledgement of a partial registration request in accordance with embodiments.
Figure 10B:
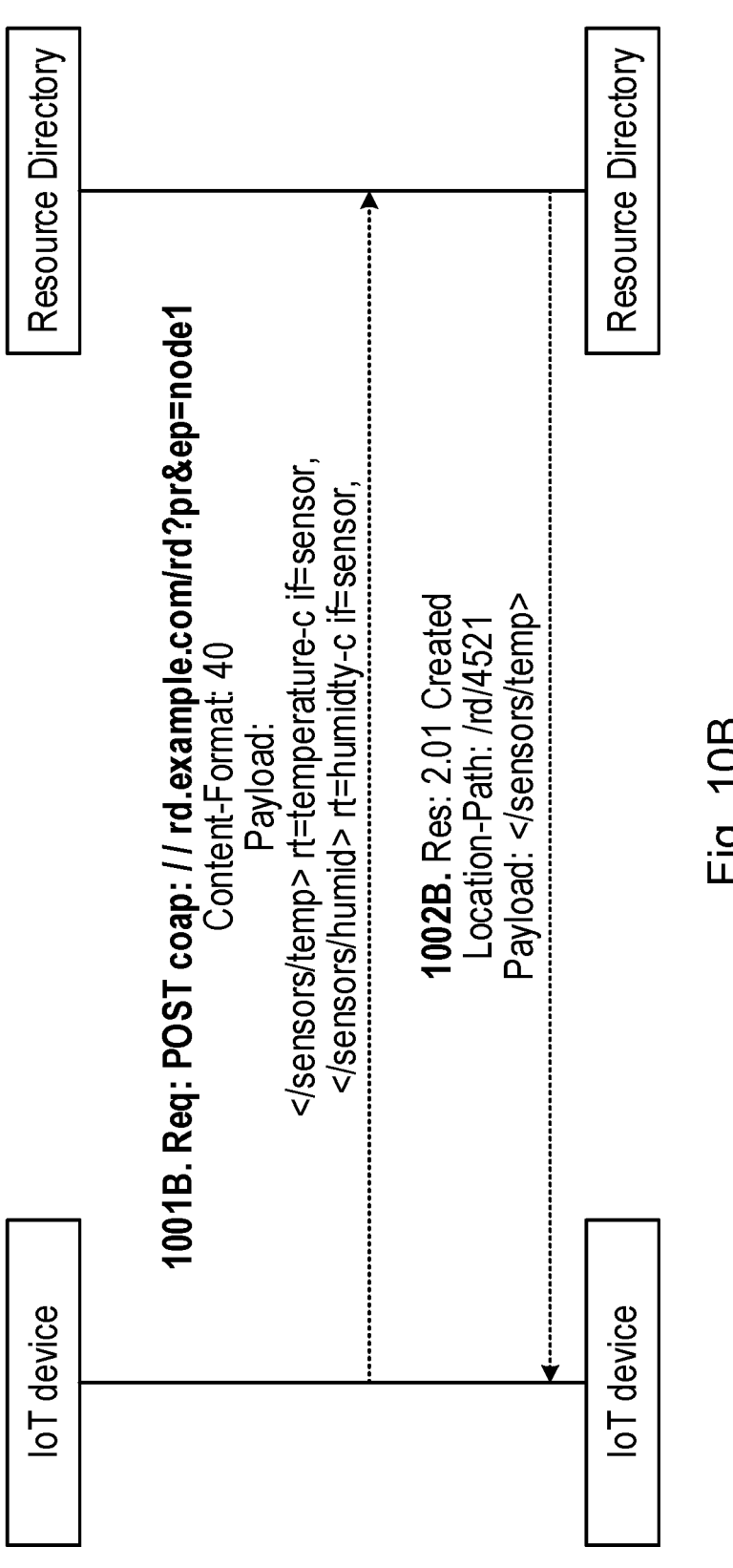
FIG. 10B is a sequence diagram showing the use of an immediate registration in accordance with embodiments.

The partial registration operation may be similar in some respects to the registration operation defined in section 5 of "CoRE Resource Directory". An endpoint such as an IoT device may register its resources using the same parameters defined in "CORE Resource Directory". A new variable 'pr' may be included in the registration request, to differentiate a registration and a partial registration operation ('pr'). A resource directory node may handle a partial registration request by: acknowledging with a 2.00 OK the reception of the request without registering any resource of that preliminary registration (the registration of those resources can be done later in a new registration operation request); or immediately registering the resources (or a subset of them) of that partial registration using the response of the partial registration operation. FIG. 10A shows an example of the use of an acknowledgement, while FIG. 10B shows an example of the use of an immediate registration.

As shown in the example of FIG. 10A, when the resource directory node receives a partial registration request from an IoT device, it may store the information of the request (including an indication of preliminary registration). Then, the following responses may be sent from the resource directory:

If the partial registration succeeds, a 200 OK or 2.00 OK may be sent to the IoT device with the location-path included in the response. The response code 200 OK is a new response code. The response may also include the location-path with the new identifier generated by the resource directory.

If the partial registration fails, a 4.00 BAD REQUEST response code may be sent to the IoT device.

Where the resource directory does not implement the partial registration operations, it may send a 4.05 "Method Not Allowed" response code to the IoT device.

FIG. 10A shows a valid partial registration request of a temperature resource. The request includes a new parameter 'pr' indicating the request is a partial registration. It also includes the name of the end point (node1). The response from the resource directory includes the location-path. The location-path is an identifier generated by the resource directory used for all the subsequent operations on this partially registered resource.

As shown in FIG. 10B, partial registration and registration may be combined in a single operation. Unlike the FIG. 10A example, the resource directory in the FIG. 10B example registers a subset of the resources from the partial registered request. When the resource directory registers a subset of the resources, it includes a payload with the resources registered in the system. The request described in relation to FIG. 10A did not include any payload in the request. When the resource directory receives a partial registration request (see steps 1001A and 1001B), it may provide the following response to the IoT device:

If the partial registration succeeds, and the resource directory decides to register some of the resources, it may send a 201 CREATED or 2.01 CREATED to the IoT device with the location-path included in the response and the list of registered resources included in the payload of the request. If the resource directory registers all the resources included in the partial registration operation, it may not need to include any payload in the response (see steps 1002A and 1002B).

If the partial registration succeeds, but the resource directory decides not to register any of the resources, it may send a 2.00 OK response to the IoT device. (similar to that shown in FIG. 10A)

If the partial registration fails, a 4.00 BAD REQUEST response code may be sent to the IoT device.

If the resource directory does not implement the partial registration operation, it may send a 4.05 "Method Not Allowed" response code to the IoT device.

FIG. 10B shows an example of a valid partial registration request of a temperature and a humidity resource. The request includes a new parameter 'pr' indicating the request is a partial registration. It also includes the name of the end point (node1). In the example, the resource directory only registers the temperature resource, not the humidity resource. The response from the resource directory includes the location-path and the temperature identifier in the payload.

Figure 11A:
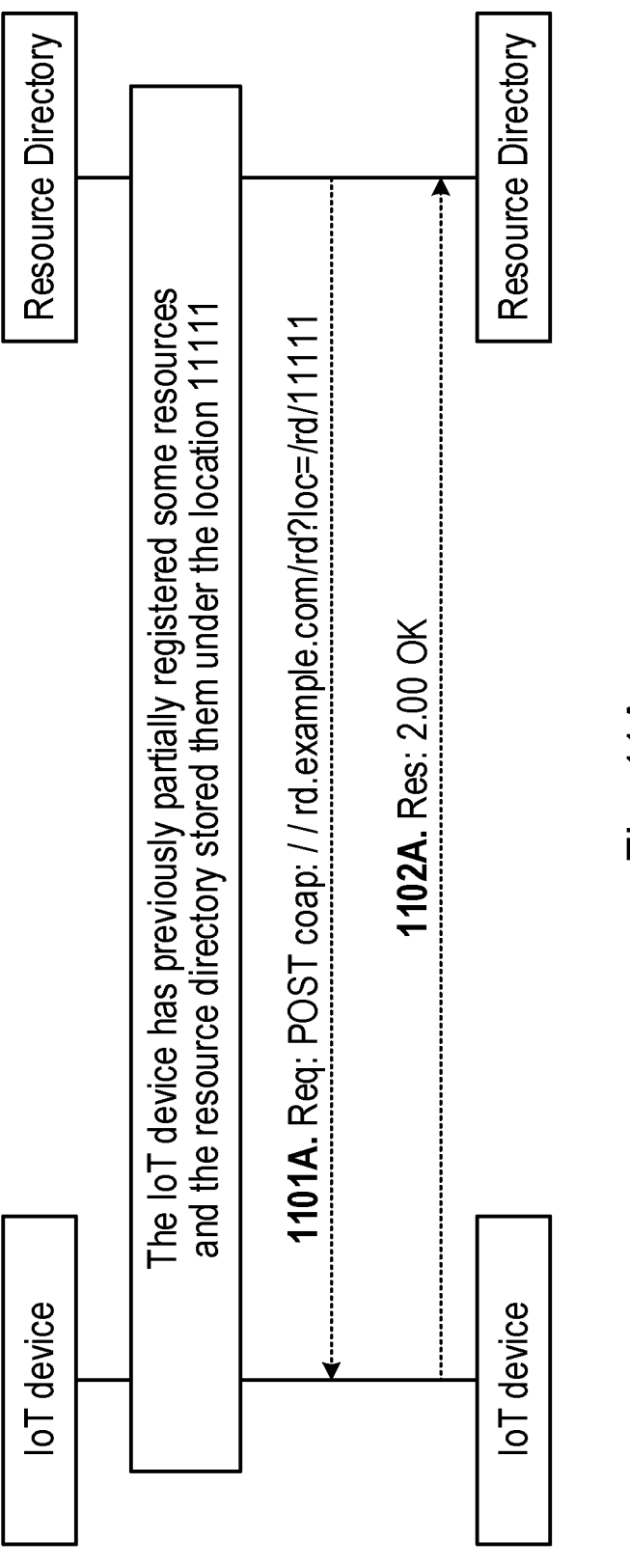
FIG. 11A is a sequence diagram showing a registration operation registering all the resources defined in a partial registration operation in accordance with embodiments.
Figure 11B:
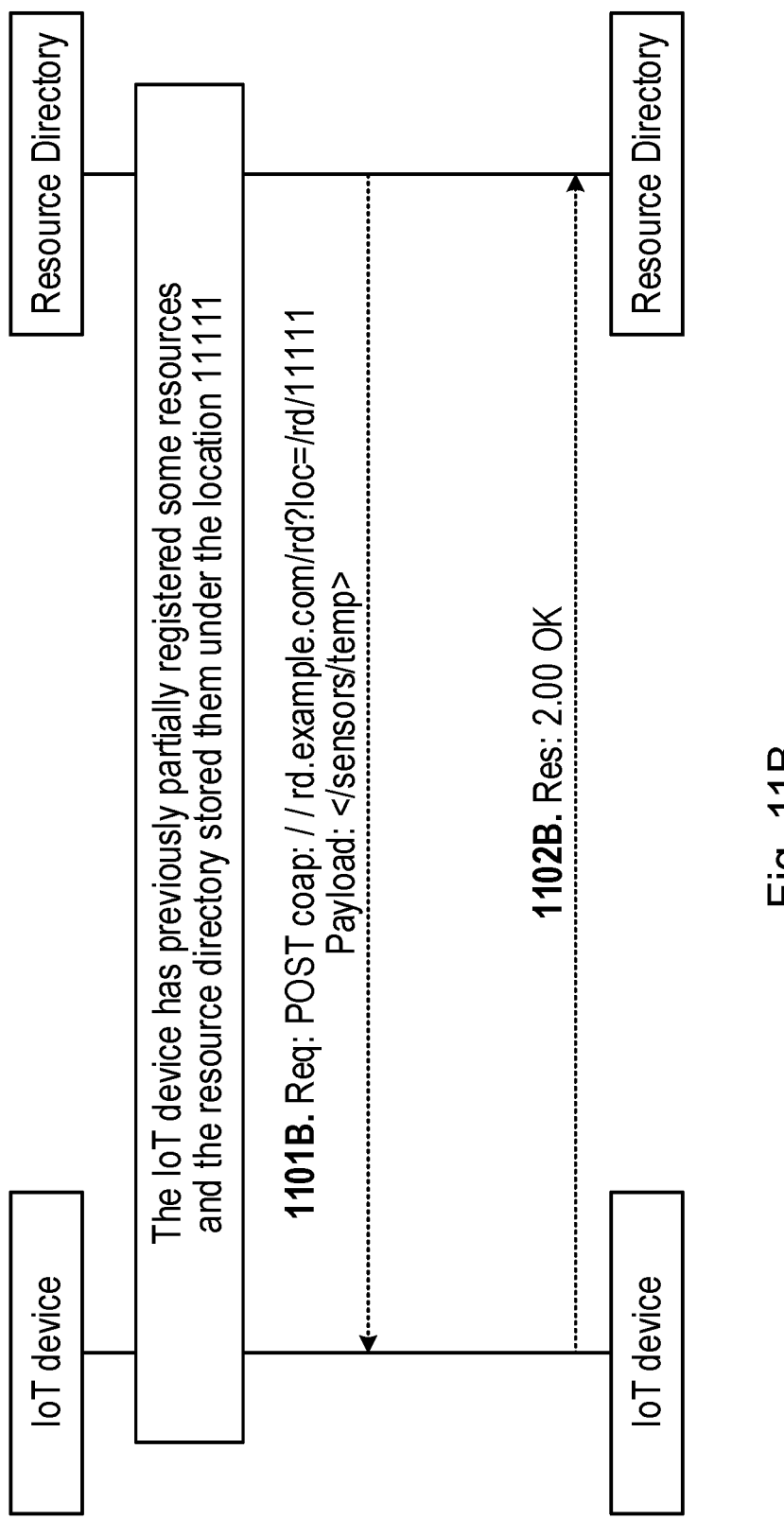
FIG. 11B is a sequence diagram showing a registration operation registering some of the resources defined in a partial registration operation in accordance with embodiments.

The registration operation defined in section 5 of "CORE Resource Directory" may be extended. Where resources are partially registered and then (fully) registered in separate operations, the registration operation may differ from that defined in "CORE Resource Directory". Registration operations in accordance with some embodiments may use a POST request along with a new 'loc' query parameter. The 'loc' query parameter may include the location-path; a unique identifier generated by the resource directory used for identifying the partial registration operation registered beforehand by the IoT device. Where the resource directory has stored the partial registration operation in its system, it can easily fetch all that information again before registering a resource. If the resource directory decides to register all the partially registered resources, it does not need to include any payload in the message to the IoT device. The IoT device may interpret a registration message without payload as indicating that the resource directory wants to register all the resources. Alternatively, if the resource directory wants to register a subset of the resources defined in the partial registration operation, the resource directory node may include a payload indicating the resources to be registered. FIG. 11A shows an example of a registration operation registering all the resources defined in a partial registration operation, while FIG. 11B shows an example of a registration operation registering some of the resources defined in a partial registration operation (specifically, a temperature sensor). In response to the registration operations (see steps 1101A and 1101B), an endpoint (such as an IoT device) may:

When the IoT device receives the registration operation successfully, send a new response code 200 OK or 2.00 OK (see steps 1102A and 1102B).

If the registration fails, send a 4.00 Bad Request to the resource directory.

If the IoT device does not implement the partial registration operation, send a 4.05 "Method Not Allowed" response code to the resource directory.

As discussed above, partial registrations and registrations may be valid for a predetermined time period (after which the information relating to the resources may be deleted from the resource directory). In some embodiments the predetermined time period may be 25 hours. The predetermined time period may be modified using the lifetime parameter from the partial registration. Typically, the registration operation re-uses the lifetime parameter (or its predetermined value) from the partial registration operation.

The predetermined time period may be updated using the registration update operation defined in the resource directory standard. If the partial registration operation included a lifetime query parameter, that lifetime parameter is used in the partial registration operation to maintain the operation active, as well as in the consecutive registrations. Once the time defined in the lifetime has elapsed, the partial registration operation or the registration operation may be deleted from the system. However, if before the partial registration expires, the resource directory registers some (or all) the resources in the partial registration, then the registration of those resources will be valid for the remaining time defined in the lifetime.

Figure 12A:
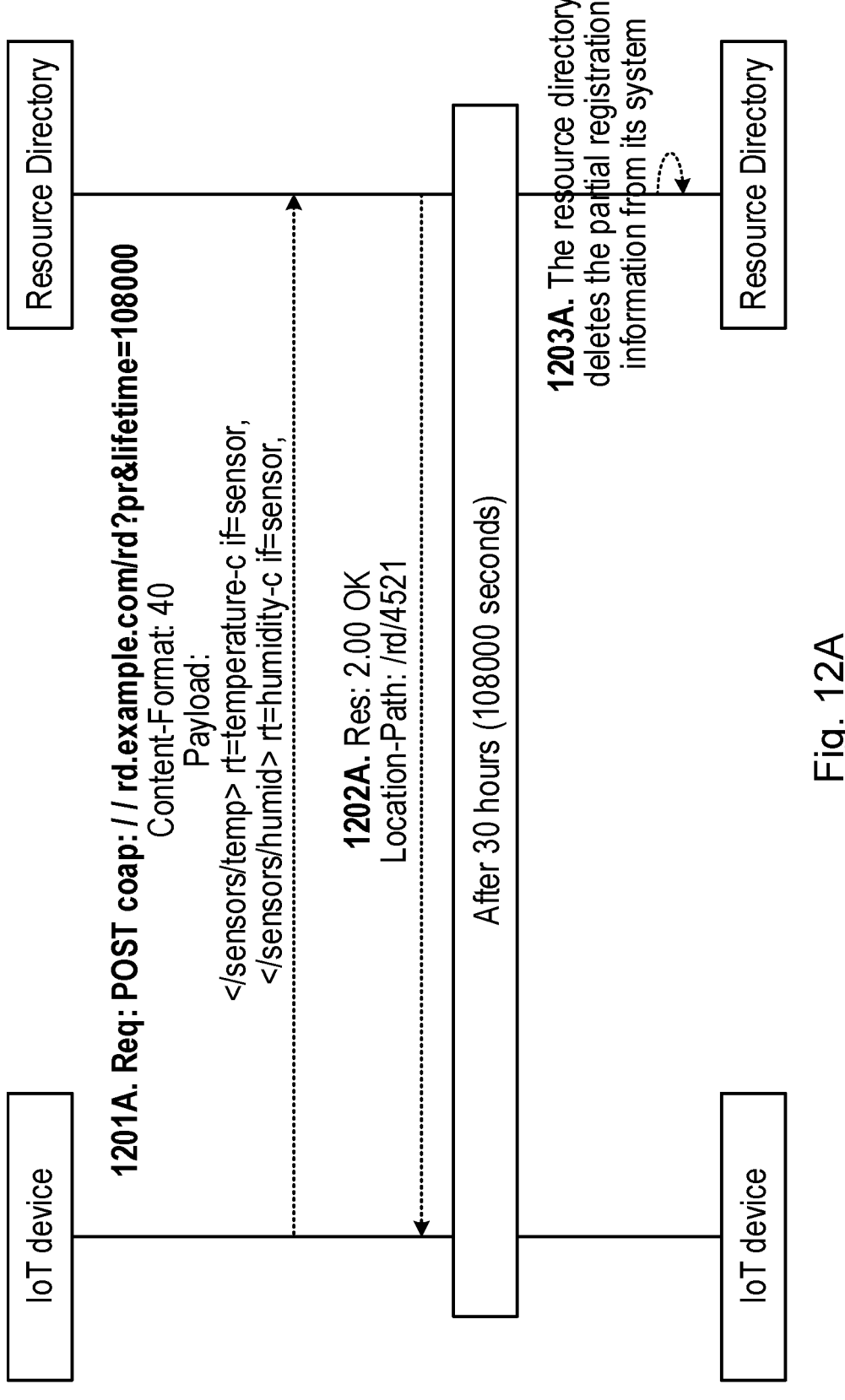
FIG. 12A is a sequence diagram showing the deletion of information after a predetermined time period has expired in accordance with embodiments.

FIG. 12A shows an example in which an IoT device partially registers some resources into the resource directory while specifying that the predetermined time period (lifetime) should be adjusted to 30 hours (108000 seconds) (as shown in steps 1201A and 1202A). After the 30 hours, the IoT device has not updated its partial registration information and the resource directory node deletes the partial registration information (including the indication of partial registration) from the resource directory as shown in step 1203A. Had the partial registration information not specified an adjustment to the predetermined time period, the default predetermined time period (in this example, 25 hours) may have been used.

Figure 12B:
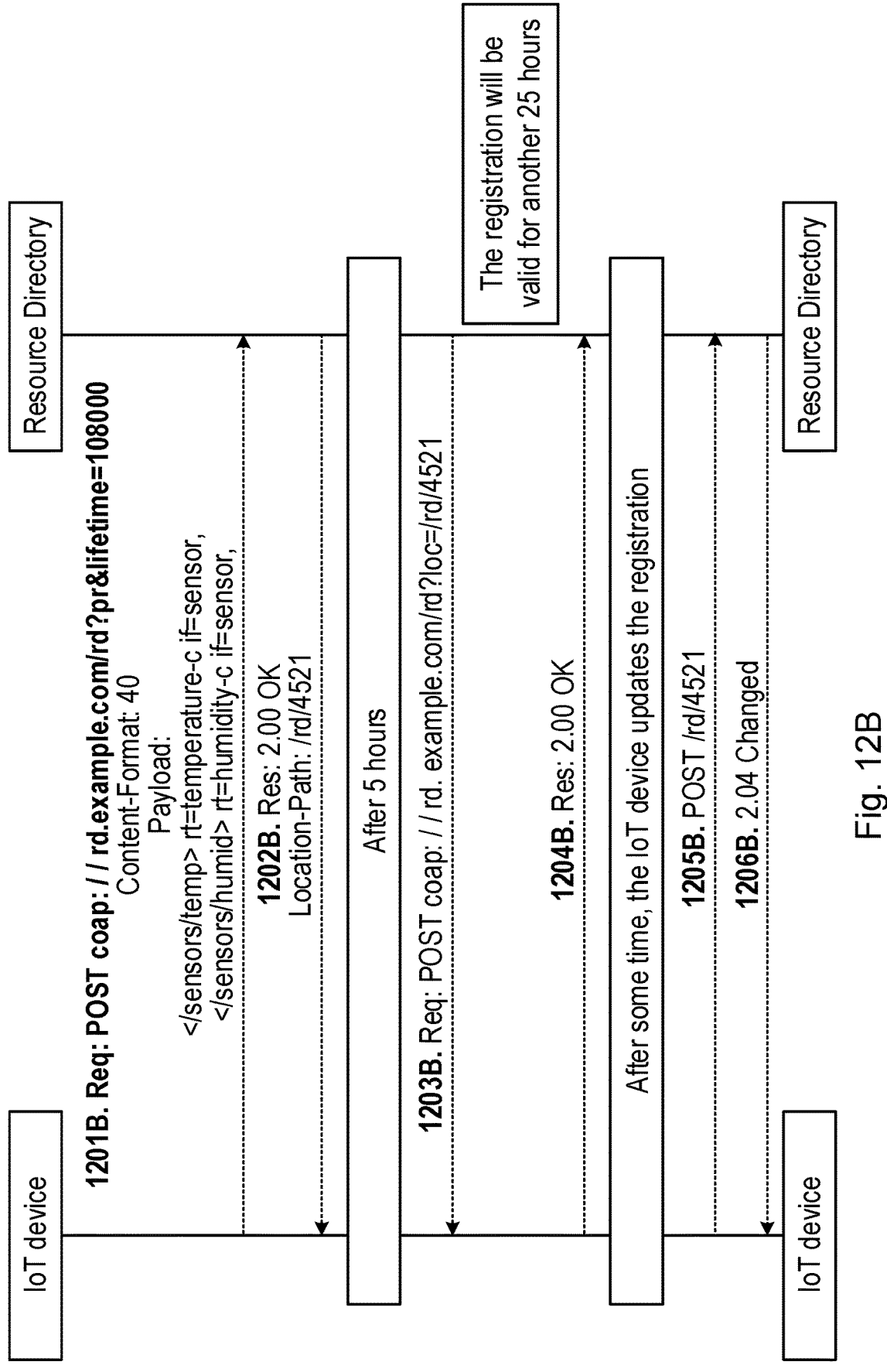
FIG. 12B is a sequence diagram showing the renewal of a time period in accordance with embodiments.

FIG. 12B shows a further example in which an IoT device partially registers some resources into the resource directory while specifying that the predetermined time period (lifetime) should be adjusted to 30 hours (108000 seconds) (as shown in steps 1201B and 1202B). In the example shown in FIG. 12B, after 5 hours, the resource directory node determines that the resources should be registered and informs the IoT device (see step 1203B), which acknowledges the registration (see step 1204B); the remaining time of the registration is therefore 25 hours. Subsequently, during the remaining 25 hours of registration, the IoT device renews the registration, as shown in steps 1205B and 1206B. As no duration for the renewal is specified, the system default period of 25 hours is used.

Embodiments allow resources provided by endpoints (such as IoT devices) to be partially registered by a resource directory node. The resources may subsequently be registered if the resource directory nodes determine to do so, said determination may be based on a policy; where a policy is used, this may be altered if the needs of the network change. Embodiments may therefore allow one or both of the registration and use of resources to be made more efficient. Unwanted redundancy of resources may be avoided. Also, where an endpoint offers multiple resources, a selection of these resources may be registered, allowing a greater degree of tailoring in the registration of resources.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure. For the avoidance of doubt, the scope of the disclosure is defined by the claims.

The invention claimed is:

1. A method for registration of resources offered by endpoints in a resource directory, the method performed by a resource directory node and comprising:

receiving, at the resource directory node from a first endpoint, a registration request, wherein the registration request comprises information on one or more resources of the first endpoint, wherein the one or more resources of the first endpoint define functions that the first endpoint offers;

analyzing, at the resource directory node, the information on the one or more resources of the first endpoint with reference to the resource directory;

determining, at the resource directory node based on the analysis, if at least one of the resources of the first endpoint should be registered; and if it is determined that at least one of the resources of the first endpoint should be registered, entering registration information for the at least one resource to be registered into the resource directory, and sending a confirmation of the registration of the at least one resource to the first endpoint.

2. The method of claim 1, further comprising storing at the resource directory node information on the one or more resources of the first endpoint, wherein the stored information includes an indication that at least one of the one or more resources is partially registered.

3. The method of claim 2, further comprising, following the receipt from the first endpoint of the registration request:

sending, to the first endpoint, a confirmation that the information on the at least one of the one or more resources has been stored, said information including the indication that the at least one resource is partially registered.

4. The method of claim 2, further comprising, if it is determined to register a resource from among the at least one resource of the first endpoint, removing the indication of partial registration from the information on that resource.

5. The method of claim 2, further comprising, if a registered resource from resource database of endpoint resources becomes unavailable, replacing the registered resource in the resource directory with an equivalent resource having information including an indication of partial registration stored, and removing the indication.

6. The method of claim 1, wherein the determination of whether at least one of the resources of the first endpoint should be registered is further based on a registration policy.

7. The method of claim 1, wherein the resource directory node and first endpoint are parts of an Internet of Things (IoT) network.

8. A resource directory node for registration of resources offered by endpoints in a resource directory, the resource directory node comprising processing circuitry and a memory containing instructions executable by the processing circuitry, whereby the resource directory node is operable to:

receive from a first endpoint, a registration request, wherein the registration request comprises information on one or more resources of the first endpoint, wherein the one or more resources of the first endpoint define functions that the first endpoint offers;

analyze the information on the one or more resources of the first endpoint with reference to the resource directory;

determine based on the analysis, if at least one of the resources of the first endpoint should be registered; and if it is determined that at least one of the resources of the first endpoint should be registered, enter registration information for the at least one resource to be registered into the resource directory and sending confirmation of the registration of the at least one resource to the first endpoint.

9. The resource directory node of claim 8, further operable to store information on the one or more resources of the first endpoint, wherein the stored information includes an indication that at least one of the one or more resources is partially registered.

10. The resource directory node of claim 9, further operable to delete the stored information including the indication a predetermined time period after the information is stored.

11. The resource directory node of claim 10, further operable to adjust the predetermined time period based on a registration update message received from the first endpoint.

12. The resource directory node of claim 10, further operable, if it is determined to register a resource from among the one or more resources of the first endpoint for which information including an indication of partial registration has been stored, to set a duration of the registration of the resource as a registration period minus the time duration the information on the resource including the indication of partial registration has been stored.

13. The resource directory node of claim 8 further operable, following receipt of the registration request from the first endpoint, to send to the first endpoint a confirmation that the information on the at least one of the one or more resources has been stored, said information including the indication that the at least one resource is partially registered.

14. The resource directory node of claim 8 further operable, if it is determined to register a resource from among the one or more resources of the first endpoint, to remove the indication of partial registration from the information on that resource.

15. The resource directory node of claim 8 further operable, if a registered resource from resource database of endpoint resources becomes unavailable, to replace the registered resource in the resource directory with an equivalent resource having information including an indication of partial registration stored, and to remove the indication.

16. The resource directory node of claim 8, further operable to determine whether at least one of the resources of the first endpoint should be registered based on a registration policy.

17. A method performed by an endpoint for requesting registration of resources offered by the endpoint in a resource directory, the method comprising:

sending, to a resource directory node, a registration request, wherein the registration request comprises information on one or more resources of the endpoint, wherein the one or more resources of the first endpoint define functions that the first endpoint offers; and receiving, from the resource directory node, confirmation of the registration of at least one resource from among the one or more resources in the resource directory.

18. The method of claim 17, further comprises:

receiving, from the resource directory node, confirmation that information on at least one resource from among the one or more resources has been partially registered.

19. An endpoint for requesting registration of resources offered by the endpoint in a resource directory, the endpoint comprising processing circuitry and a memory containing instructions executable by the processing circuitry, whereby the endpoint is operable to:

send, to a resource directory node, a registration request, wherein the registration request comprises information on one or more resources of the endpoint, wherein the one or more resources of the first endpoint define functions that the first endpoint offers; and receive, from the resource directory node, confirmation of the registration of at least one resource from among the one or more resources in the resource directory.

20. The endpoint of claim 19, wherein the endpoint is operative to:

receive, from the resource directory node, confirmation that information on at least one resource from among the one or more resources has been partially registered.

* * * * *